United States Patent [19]
Brachthauser et al.

[11] 4,425,092
[45] Jan. 10, 1984

[54] SYSTEM FOR BURNING FINE-GRAINED MATERIAL, PARTICULARLY FOR THE MANUFACTURE OF CEMENT CLINKERS

[75] Inventors: Kunibert Brachthauser, Bergisch Gladbach; Horst Herchenbach, Troisdorf, both of Fed. Rep. of Germany

[73] Assignee: Klöckner-Humboldt-Deutz AG, Fed. Rep. of Germany

[21] Appl. No.: 290,177

[22] Filed: Aug. 5, 1981

Related U.S. Application Data

[63] Continuation-in-part of Ser. No. 63,102, Aug. 2, 1979, Pat. No. 4,298,393.

[30] Foreign Application Priority Data

Aug. 2, 1978 [DE] Fed. Rep. of Germany ....... 2833744

[51] Int. Cl.³ .............................................. F27B 7/02
[52] U.S. Cl. ...................................... 432/106; 34/93; 373/1; 373/2; 373/3; 373/5; 373/7; 432/58
[58] Field of Search ...................... 432/106, 58; 373/1, 373/2, 3, 5, 6, 7; 34/93

[56] References Cited

U.S. PATENT DOCUMENTS

| | | | |
|---|---|---|---|
| 1,585,344 | 5/1926 | Greenawalt et al. | 202/121 |
| 2,108,043 | 2/1938 | Crist | 75/33 |
| 2,621,034 | 12/1952 | Stecker | 432/58 |
| 3,203,681 | 8/1965 | Rosa et al. | 432/58 |
| 3,275,787 | 9/1966 | Newberry | 75/65 R |
| 4,032,121 | 6/1977 | Stift et al. | 432/106 |
| 4,094,626 | 6/1978 | Boyhont et al. | 432/106 |
| 4,125,366 | 11/1978 | Boyer | 34/4 |
| 4,240,210 | 12/1980 | Huang | 34/93 |

*Primary Examiner*—John J. Camby
*Attorney, Agent, or Firm*—Hill, Van Santen, Steadman & Simpson

[57] ABSTRACT

The invention relates to a method for burning fine-grain material, particularly for the manufacture of cement clinker from cement raw meal. The material is thermally treated in a multi-stage burning process with a pre-heating stage, a calcining stage with a high-degree of calcination, a sintering stage in a very short rotary kiln and a cooling stage. Fuel is introduced both into the sintering stage in the short rotary kiln as well as into the calcinating stage. Hot exhaust air from the cooling stage is supplied both to the sintering stage as well as to the calcining stage as furnace air. The invention also relates to an apparatus for the manufacture of mineral products of the burning process such as cement clinker.

25 Claims, 5 Drawing Figures

SYSTEM FOR BURNING FINE-GRAINED MATERIAL, PARTICULARLY FOR THE MANUFACTURE OF CEMENT CLINKERS

CROSS REFERENCE TO RELATED APPLICATION

This application is a continuation-in-part of our copending application, U.S. Ser. No. 063,102, filed Aug. 2, 1979, now U.S. Pat. No. 4,298,393, and assigned to the same assignee as the present application.

BACKGROUND OF THE INVENTION

1. Field of the Invention

The invention pertains to methods and apparatus for the production of cement clinker.

2. The Prior Art

With the introduction of raw meal pre-heaters into the cement clinker burning process, rotary kilns which up to then had been long could be built shorter. With modern burning systems incorporating conventional cyclone pre-heaters, a ratio between the length of the rotary kiln to the inside rotary kiln diameter of approximately 15:1 through 17:1 has become general in practice. Efforts of the system manufacturers to further reduce the relative rotary kiln length have failed because of the safety requirements of the system users. Longer rotary kilns have tended to result in disruption-free operation, particularly with respect to interior cycles.

With the introduction of pre-calcination technology with secondary firings in the pre-heating system, a high degree of deacidification of the raw meal was achieved before entry into the rotary kiln. The advantages of lower heat introduction in the sintering zone of the rotary kiln, however, were only partially exploited. The kiln diameter was approximately reduced in relationship to the proportionate heat amounts supplied, on the one hand, to the pre-burner locations and, on the other hand, to the sintering zone of the rotary kiln. Until now, the standard ratio of kiln length to inside kiln diameter (15:1 through 17:1) mentioned above was approximately retained. As a result, specific rotary kiln lengths which were still large ensued, which resulted in high investment and operating costs. On the other hand, a reduction of the diameter of the rotary kiln, given the same throughput capacity and the same degree of oven charge, produced a shorter dwell period of the raw meal or, respectively, clinker in the rotary kiln. Therefore, until now, a further shortening of the rotary kiln was not considered.

The substances volatilizing in the rotary kiln often exhibit harmful components such as alkali compounds and sulfur which, upon their condensation from the rotary kiln exhaust gas, lead to caking in the lines conducting the gas. Moreover, these harmful components enter the raw meal pre-heating system together with the rotary kiln exhaust gas where they precipitate on the raw meal and are reintroduced into the rotary kiln with the pre-heated raw meal. A highly accumulating cycle of harmful substances can thus be formed in the burning process. In order to avoid this disadvantage, it is conventional to draw off a portion of the hot rotary kiln exhaust gases from the burning process via a bypass and to discard it. The significant heat content of the thermally highly valuable exhaust gas of the rotary kiln is, however, lost from the burning process by this technique. As a result, the entire burning process can become uneconomical. Particularly in very large cement manufacturing systems, it can no longer be justified in terms of heat efficiency to discard too much rotary kiln exhaust gas containing harmful substances without exploiting its heat content. By so doing, the manufacturing costs of cement, given today's energy costs and those to be expected in future, become too high.

SUMMARY OF THE INVENTION

In the inventive method only the smallest possible part of fuel is burned in the rotary kiln. The exhaust gas resulting therefrom is as small as possible and is drawn off by a bypass in an amount ranging from 0 through 100% before its use for raw meal pre-heating and/or raw meal calcination.

In the inventive method, a high degree of calcination of the raw meal is carried out outside of the rotary kiln in the calcinating stage so that the heat energy to be supplied to the rotary kiln is as small as possible. This smallest possible amount of heat energy to be supplied to the rotary kiln is produced by burning the smallest possible amount of fossil fuel in the rotary kiln. As a result, the smallest possible amount of combustion gases arise in the rotary kiln. By so doing, the rotary kiln can be built relatively short without a negative influence on the heat transfer between gas and material. Investment costs are thus saved; on the other hand, due to the reduction of the amount of rotary kiln exhaust gas, the concentration of the volatilized harmful substances such as alkali compounds and sulfur in the exhaust gas increases. For this reason alone, as well as because of the reduced amount of exhaust gas, whose heat content is likewise reduced, the partial or complete removal and rejection of this rotary kiln exhaust gas via a bypass can be economically justified.

The heat efficiency of the inventive method results from, and the removal of the rotary kiln exhaust gas from the burning process is above all profitable when, a greater percentage of the entire amount of rotary kiln exhaust gas is drawn off via a bypass as this amount of rotary kiln exhaust gas is made smaller. At the same time, the dimensions of the rotary kiln can be reduced all the more since less fossil fuel is burned in the rotary kiln.

To further increase the heat efficiency of the inventive method, and further reduce the amount of rotary kiln exhaust gas, at least one part of the fossil fuel burned in the rotary kiln can be replaced by means of heat generators which cause no exhaust gas in the rotary kiln. By so doing, the concentration of harmful substances in the rotary kiln exhaust gas increases even further and the heat losses due to the rejection of this exhaust gas become even smaller. This method will be particularly profitable if a significant part of the total amount of rotary kiln exhaust gas, approximately between 50 through 100%, is drawn off via a bypass and is removed from the burning process. Since the amount of exhaust gas from the rotary kiln has been even further reduced, the dimensions of the rotary kiln can be made even smaller.

The heat generators causing no exhaust gas in the rotary kiln can consist, for example, of electrical heating elements such as resistance or induction heaters, transmitters of high-energy rich beams such as beams of accelerated electrons for irradiation of the material, solar energy heaters or the like.

An improved burning system for the manufacture of mineral burning products, such as cement clinker from raw material, has a raw meal pre-heater, a calcinator which produces a high-degree of calcination of the raw meal, a rotary kiln and a clinker cooler. The ratio of the length of the rotary kiln to its inside diameter is smaller than 14:1 and preferably lies in a range of 7:1 through 11:1. A bypass line for the removal of rotary kiln exhaust gas is connected at the material intake end of the kiln to the rotary kiln exhaust gas channel leading to the calcinator or, respectively, raw meal pre-heater. This inventive burning system, thus, has a bypass line for the removal of rotary kiln exhaust gas. A rotary kiln with a relatively very small specific kiln length may thus be used. The use of the bypass line is all the more economically justifiable the shorter the rotary kiln is and the less fossil fuel is burned in the rotary kiln. It is precisely the intensive thermal and chemical preparation of the material for sintering and clinkering in the rotary kiln which allows the ¢working length" of the rotary kiln to be significantly shortened, insofar as this length is required for the preparation for the sintering and, thus, to significantly shorten the over-all rotary kiln. Said preparation is attainable with the assistance of a high-degree of precalcination.

Thus, surprisingly, it is possible to reduce the specific kiln length by approximately one-half with respect to the value standard up to now in a rotary kiln which is designed for modern dry processes for burning intensely pre-calcinated material into products of the burning process such as cement clinker. Expressed in numbers, the ratio of kiln length to the inside kiln diameter in such a rotary kiln is reduced from the previous approximately 16:1 to 8:1. A few advantages of the inventive burning system with short rotary kiln with respect to a system with traditional rotary kiln are the following:

Less kiln raw material, less kiln brick lining subject to wear, less surface radiating heat, therefore lower heat losses, lower weight, therefore also the need of lower driving power, and heat expansion is no longer such a problem. With less heat expansion, more favorable conditions exist for kiln seatings and seals.

In all, lower investment and operating costs of the burning system thereby ensue along with the advantage that, as a result of keeping the amount of exhaust gas as small as possible, a partial or complete removal of this exhaust gas from the burning process can now be economically justified.

Alternately, it has been found advantageous to incorporate non-fossil fuel heat generators in the calcining unit. These additional heat generators can supply about 20% of the total heat requirement of the calcining unit. The remaining 80% can be supplied by the fossil fuel burning elements in the calcining unit.

The use of non-fossil fuel heating elements in the calcining unit contributes to a saving of valuable fossil fuel as well as a minimization of the overall dimensions of the rotary kiln. Infrared radiators or electric heating units can be used in the calcining section.

DETAILED DESCRIPTION OF THE PREFERRED EMBODIMENTS

Not by way of limitation, but by way of disclosing the best mode of practicing our invention and by way of enabling one of ordinary skill in the art to practice my invention, there are disclosed in FIGS. 1-5 alternate embodiments of our invention.

Figure 1:
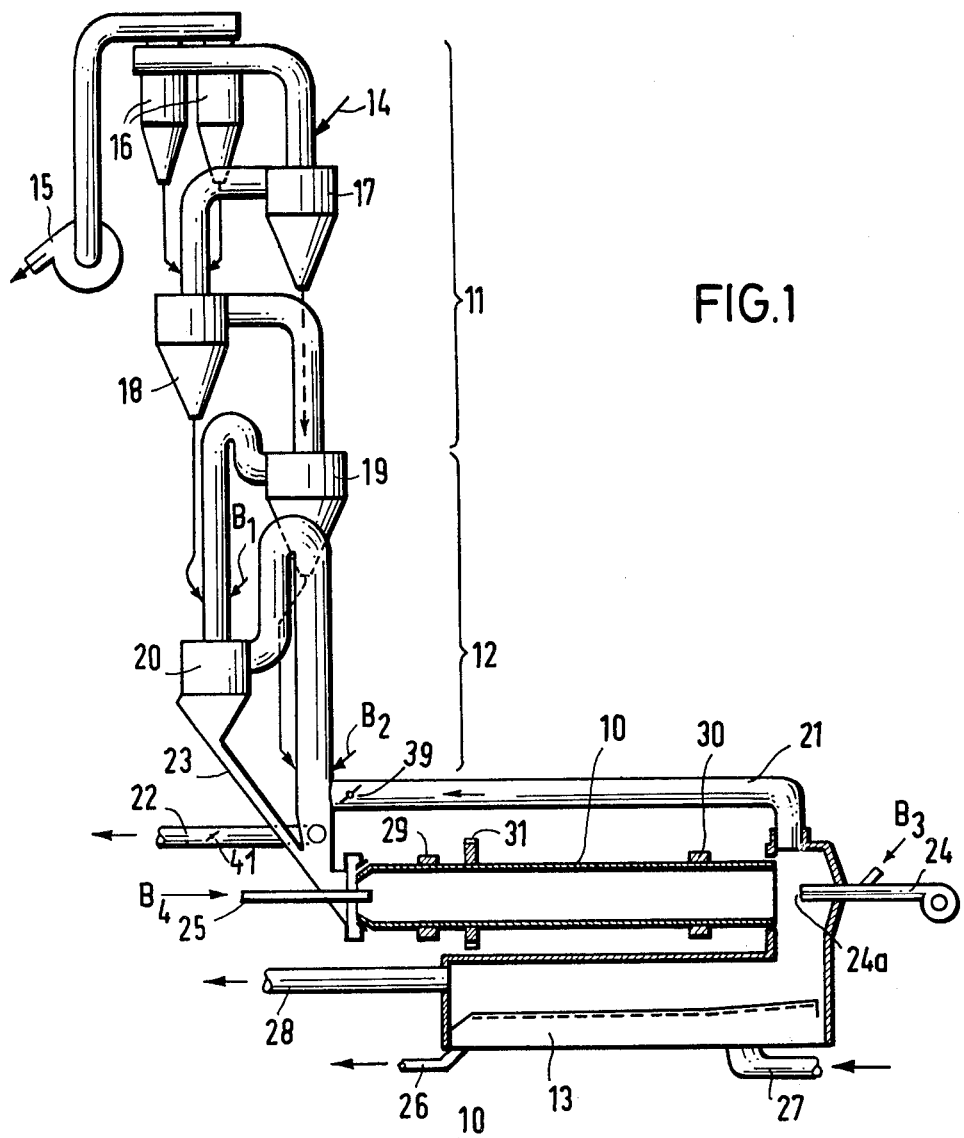
FIG. 1 illustrates a burning system for cement clinker manufacture with a short rotary kiln and bypass for rotary kiln exhaust gas.

The burning system of FIG. 1 exhibits a rotary kiln 10 to which a raw meal pre-heater 11 and a calcinator 12 are pre-connected and to which a clinker cooler 13 is post-connected. Cement raw meal 14 flows from the top toward the bottom through the pre-heater 11 and calcinator 12 in a combined counterflow/direct flow to the hot exhaust gases leaving the rotary kiln 10 and/or to the hot exhaust air of the cooler 13. These exhaust gases are drawn off by means of the induced-draught blower 15. The raw meal pre-heater 11 consists of cyclone heat exchangers 16, 17, 18. To induce the intense or high-degree of calcination of the cement raw meal before the meal enters into the rotary kiln 10, fuel $B_1$ is supplied between the cyclone heat exchangers 18 and 19 and fuel $B_2$ is supplied between the heat exchangers 19 and 20 as seen in the direction of flow of the cement raw meal. In the first burning stage or fuel burning point $B_1$, approximately 30% of the calcining work is carried out, approximately 70% in the second burning stage $B_2$. Preferably, the two burning stages utilize various types of inferior fuels. In the lower burning stage, fuel $B_2$ of every type is burned in a gas atmosphere that is formed from the cooler exhaust air supplied via the tertiary air line 21 and, under certain conditions, of rotary kiln exhaust gas. The fuel $B_2$ and gas from line 21, upon intimate mixing with the raw meal pre-heated in the raw meal pre-heater burns in such a manner that the heat or combustion is directly communicated to the raw meal and is employed to produce the desired intense or high-degree of calcining. A bypass line 22 for the removal of rotary kiln exhaust gas containing harmful substances is arranged in the rotary kiln exhaust gas channel to the calcinator 12 or, respectively, raw meal preheater 11. The highly calcined cement raw meal enters into the rotary kiln 10 through line 23.

Figure 3:
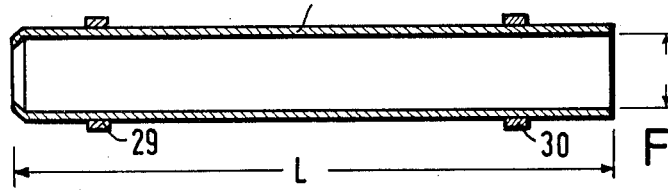
FIG. 3 illustrates the short rotary kiln of the burning system of FIG. 1 in a longitudinal section and in enlarged representation.

As shown in FIG. 3, the rotary kiln 10 has a ratio of the length L to the inside diameter D of approximately 8:1 and therefore has an unusually small specific kiln length.

A burning location or point 24a in which fossil fuel $B_3$ is burned is located at the discharge end of the rotary kiln 10 and is supplied via a primary air line 24. An additional supply of fuel $B_4$ particularly in lumpy form can be provided at a fuel burning point near the material intake end of the rotary kiln 10 via line 25. The solid fuel is preferably composed of unground coal pieces which quasi-swim on the raw meal and burn in the raw meal almost without flame, whereby the efficiency of the heat transfer is very high. The finished, burned cement clinker is cooled in the clinker cooler 13. The cooled material leaves cooler 13 via line 26. Fresh air streams into the cooler through line 27; a part of the cooler exhaust air is drawn off via line 28.

Since the inventive short rotary kiln 10 has a comparatively small specific kiln length, it can be seated on only two seating locations 29 and 30. The drive of the rotary kiln is indicated with 31.

Figure 4:
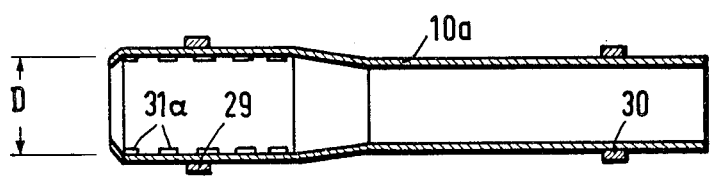
FIG. 4 illustrates a short rotary kiln designed differently from that of FIG. 3.

The rotary kiln 10a of FIG. 4 has a greater interior diameter in the area of its material introduction or, respectively, in its sintering preparation zone than in the remaining rotary kiln longitudinal area. In the area with expanded diameter, the interior walls of the rotary kiln exhibit ceramic lifting installations 31a for lifting and scattering the material to be sintered, whereby the heat transfer between rotary kiln exhaust gas and material is intensified. Moreover, the dwell time of the material in the rotary kiln is increased with a simultaneous reduction of the gas velocity due to the fact that the sintering preparation zone is expanded in cross section. As a result, the heat transfer between gas and material is likewise improved.

Figure 2:
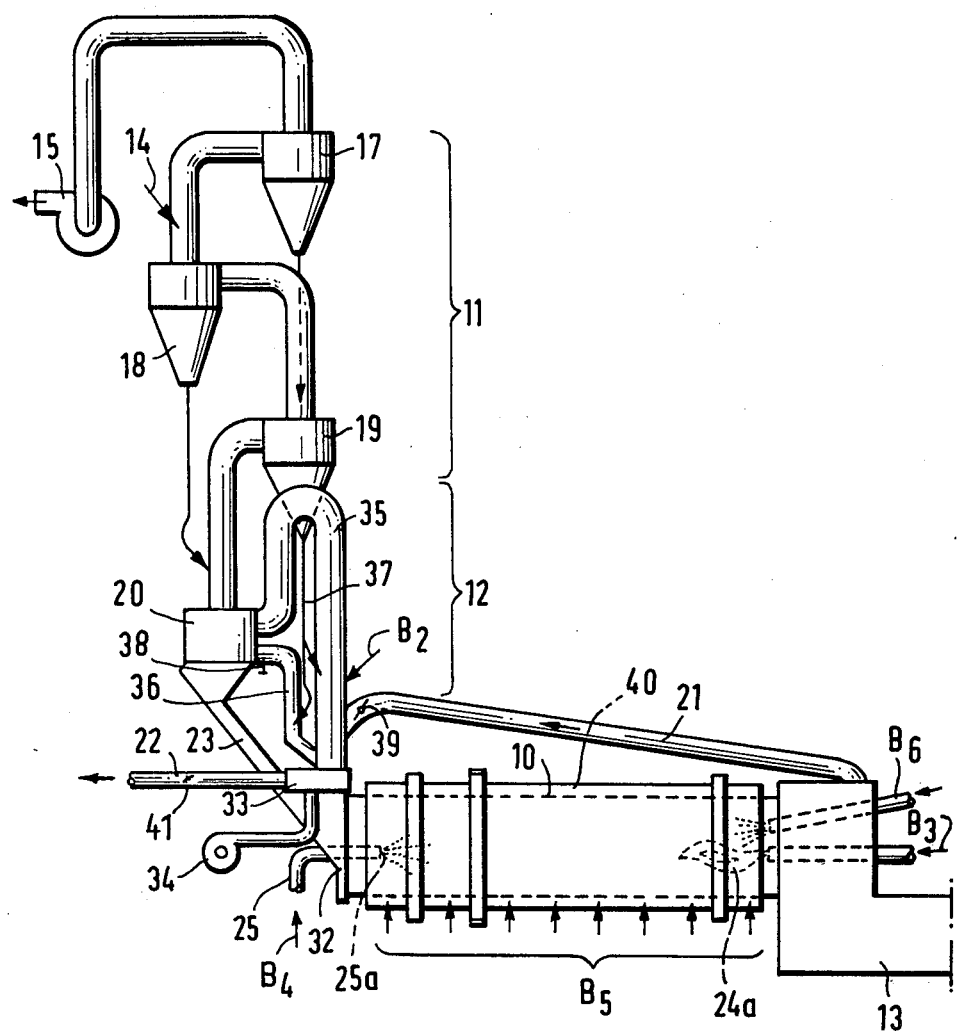
FIG. 2 illustrates an embodiment of the burning system that is different from that of FIG. 1.

In the burning system of FIG. 2, parts coinciding with FIG. 1 are provided with the same reference numerals. A mixing chamber 33 in which hot rotary kiln exhaust gas of approximately 1300° C. is very quickly cooled to approximately 400° through 600° C. by admixture of cold air supplied via blower 34 and/or addition of water and/or raw meal is arranged above the kiln intake head 32 of the rotary kiln 10.

The cooled rotary kiln exhaust gas is drawn off via the bypass line 22. Preferably, approximately 20 through 100% of the total amount of rotary kiln exhaust gas is drawn off via the bypass. This percentage of the amount of exhaust gas is all the greater the smaller the total amount of rotary kiln exhaust gas is. The 20% through 100% of the exhaust gases drawn off via the bypass line 22 is cooled from about 1300° C. to 400° C. through 600° C. by the addition of cold air.

The remaining amount of rotary kiln exhaust gas is conducted into the lowest cyclone 20 of the cyclone heat exchanger system via the ascending line 35 of the calcinator 12 and/or via a line 36. The stream of material 37 leaving the cyclone 19 is divided into two streams by a distribution element which is not illustrated. One partial stream of the material is conducted into the ascending line 35 of the calcinator 12 designed as a burning segment. The other partial stream of the material is introduced into the exhaust gas line 36. The rotary kiln exhaust gas in line 36 is cooled by the partial stream of the material to such a degree that this rotary kiln exhaust gas as well as the exhaust gas in the calcining device 12 exhibit an approximately identical temperature of approximately 800° through 900° C. upon their mixing in cyclone 20. In this manner, no kiln exhaust gas containing harmful matter arrives in the descending line 35 of the calcinator 12 designed as a burning segment.

The distribution of the amount of rotary kiln exhaust gas not drawn off by the bypass line 22 to the exhaust gas line 36 and/or to the ascending line 35 of the calcinator 12 can be accomplished by means of regulating elements 38, 39 or, respectively, 41 in lines 36, 21 or, respectively, 22.

The burning location 24a or, respectively, the burning locations 24a and 25a of the rotary kiln 10 which produce exhaust gases in the rotary kiln 10 are at least partially replaced in the sample embodiment of FIG. 2 by means of heat generators arranged on or, respectively, in the rotary kiln. These heat generators cause no exhaust gases in the rotary kiln and are symbolically illustrated by means of many small arrows with the designation $B_5$. A numerical example follows.

Of the heat energy to be supplied to the total burning process, 65% must be supplied to the pre-heater 11 and the calcinator 12 and the remaining 35% must be supplied to the rotary kiln 10. Up to now, this 35% heat requirement in the rotary kiln 10 was provided by means of the single burning location 24a. In order to reduce the amount of rotary kiln exhaust gas and, thus, also the heat loss that arises due to the removal of rotary kiln exhaust gases containing harmful substances via the bypass 22, the amount of the fossil fuel $B_3$ can be inventively reduced to such a degree that it provides only 15% of the heat requirement in the rotary kiln instead of 35%; the heat generators $B_4$ and $B_5$ produce no exhaust gases in the rotary kiln 10, and each provides the remaining heat requirement of, for example, respectively 10%, so that the total 35% heat energy is then generated in the rotary kiln.

The heat generators $B_5$ are, for example, electric heating elements such as resistance or induction heaters which are built into the fireproof lining of the rotary kiln and keep the interior wall temperature at, for example, 1200° C. The rotary kiln 10 is advantageously equipped with a heat insulation 40. Upon the reduction of the fuel $B_3$ for the burning location 24a, a transmitter $B_6$ of high-energy rich beams can be arranged in its area, which beams then replace the missing heat requirement of the rotary kiln by means of radiation chemical treatment of the material. Such a transmitter 25a can also be arranged at the material intake side of the rotary kiln.

The amount of fossil fuel $B_3$ supplied to the rotary kiln 10 should not be completely reduced to zero. A certain amount of exhaust gas in the kiln 10 is necessary. The volatilizing harmful components such as alkali compounds and sulfur condense on the dust particles suspended in the exhaust gas in the rotary kiln 10.

It will be understood that the invention is also employable in burning systems in which the gas and material are conducted in the pre-heater and calcinator in two or more series parallel to one another.

Figure 5:
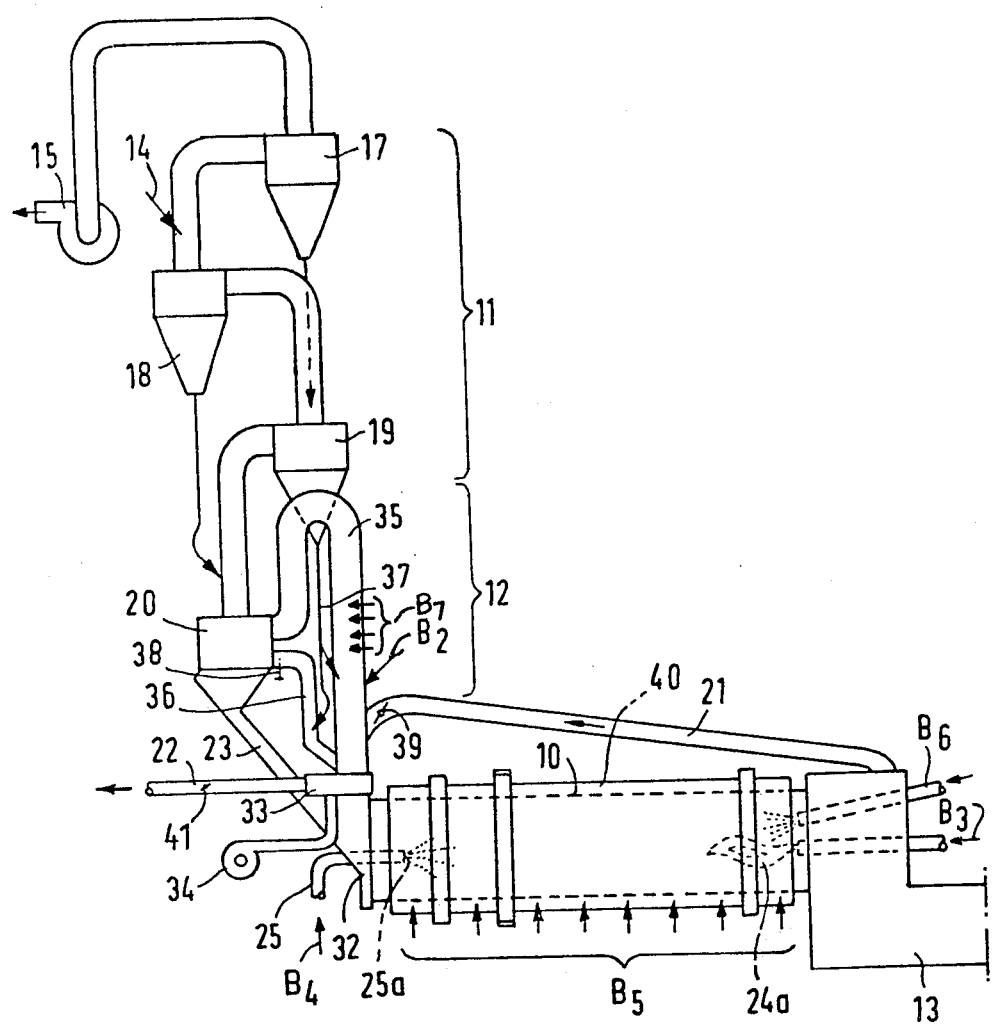
FIG. 5 is a schematic diagram of a burning or sintering installation incorporating non-fossil fuel heat generators in the calcining unit as well as in the rotary kiln.

Additionally, it has been found that the heat energy supplied by the burners or burning locations $B_1$, $B_2$ in the calciner 12 of FIG. 1 or the burning locations or burners $B_2$ in the calciner 12 of FIG. 2 can be partly replaced by heating elements that do not produce exhaust gases. FIG. 5 which is an installation corresponding to FIG. 2 shows an additional set of heat generators $B_7$ arranged on or in calciner 12. The heat generators $B_7$ produce no exhaust gases in calciner 12. Heat generators $B_7$ can be used in combination with heat generators $B_5$ or $B_6$. Alternatively, heat generator $B_7$ can be used without heat generators $B_5$, $B_6$.

Of the total heat energy required by the calciner 12 approximately 20% can be supplied by heat generators $B_7$. The remaining 80% of the necessary heat energy to be supplied to the calciner 12 can be produced by the combustion of fossil fuels in burners or burning elements $B_1$, $B_2$, or $B_2$ alone. The exhaust gases from the fossil fuels contribute to keeping the raw meal passing through the calciner 12 in suspension.

The additional heat generators $B_7$ can be used with kilns shown in FIGS. 3, 4, as well as in the installation of FIG. 1. Infrared radiators can be used as the heat generators $B_4$–$B_7$. Available infrared heaters can heat the irridiated material to approximately 1000° C. and higher. Electric heating units such as resistance or induction heaters can also be used. High energy particle beams, produced by an appropriate source, such as accelerated electrons, can be used as heat generators $B_4$–$B_7$, to irridiate and heat the raw meal being calcined. Solar heaters can also be used for heating elements $B_4$–$B_7$.

Although various modifications might be suggested by those skilled in the art, it should be understood that we wish to embody within the scope of the patent warranted hereon all such modifications as reasonably and properly come within the scope of our contribution to the art.

We claim as our invention:

1. In a combustion installation for the production of mineral combustion products such as cement clinkers out of raw meal having a raw meal preheater, a rotary kiln and a clinker cooler, an improvement comprising:
   a calciner having an input connected to the output of said preheater and an output connected to the input of said rotary kiln;
   fossil fuel burning means operatively connected to said calciner to partly heat and partly calcine the raw meal passing therethrough; and
   non-combustion heating means operatively connected to said calciner to provide additional heat to the raw meal passing therethrough without introducing any additional gases into said calciner.

2. The installation of claim 1, including further:
   second fossil fuel burning means operatively connected to said kiln to partly heat and sinter the material passing therethrough; and
   second heating means operatively connected to said kiln to provide additional heat to the material passing therethrough without introducing any additional gases into said kiln.

3. The installation of claim 1, wherein said heating means comprises:
   electric heating elements consisting of resistance heating units.

4. The installation of claim 1, wherein said heating means comprises:
   a source of high energy particles adapted to irradiate the raw meal passing through said calciner.

5. The installation of claim 1, wherein said heating means comprises:
   a source of infrared radiation adapted to irradiate the raw meal passing through said calciner.

6. The installation of claim 1, wherein said heating means comprises:
   a source of heat generated by solar energy adapted to heat the raw meal passing through said calciner.

7. The installation of claim 1, wherein said calciner has two stages with said fossil fuel burning means comprising first and second heating locations with one location in each of said two stages.

8. The installation according to claim 1, wherein:
   said fossil fuel burning means is adapted to generate on the order of 80% of the heat needed for said calciner; and
   said heating means is adapted to generate the remaining heat needed for said calciner.

9. The installation according to claim 2, wherein:
   said second heating means consisting of resistance heaters.

10. The installation according to claim 2, including a third heating means affixed to an input end of said kiln;
    said third heating means consisting of resistance heaters.

11. The installation according to claim 2, including a fourth heating means affixed to an output end of said kiln;
    said fourth heating means consisting of resistance heaters.

12. The installation of claim 2 wherein said second heating means consists of induction heaters.

13. The installation of according to claim 2 wherein said second heating means consists of infrared heaters.

14. The installation according to claim 2 wherein said second heating means consists of solar heaters.

15. The installation according to claim 2 wherein said second heating means consists of sources of high energy particle beams.

16. The installation of claim 2 including a third heating means affixed to an input end of said kiln and consisting of induction heaters.

17. The installation of claim 2 including a third heating means affixed to an input end of said kiln and consisting of infrared heaters.

18. The installation of claim 2 including a third heating means affixed to an input end of said kiln and consisting of solar heaters.

19. The installation of claim 2 including a third heating means affixed to an input end of said kiln and consisting of sources of high energy particle beams.

20. The installation of claim 2 including a fourth heating means affixed to an output end of said kiln, said fourth heating means consisting of induction heaters.

21. The installation of claim 2 including a fourth heating means affixed to an output end of said kiln, said fourth heating means consisting of infrared heaters.

22. The installation of claim 2 including a fourth heating means affixed to an output end of said kiln, said fourth heating means consisting of solar heaters.

23. The installation of claim 2 including a fourth heating means affixed to an output end of said kiln, said fourth heating means consisting of sources of high energy particle beams.

24. The installation of claim 1 wherein said heating means comprises inductive heating means.

25. In a combustion installation for the production of mineral combustion products such as cement clinkers out of raw meal comprising:
    a raw meal preheater;
    a calciner receiving preheated meal from said preheater;
    a rotary kiln having an input end receiving calcined meal from said calciner, and an output end;
    a clinker cooler receiving clinker from the output end of said rotary kiln;
    fossil fuel burning means operatively connected to said kiln to partly heat and sinter the material passing therethrough;
    first heating means affixed along the length of said kiln between said input end and said output end;
    second heating means affixed at said input end of said kiln;
    third heating means affixed at said output end of said kiln;
    said heating means being adapted to provide additional non-combustion type heat to the material passing through said kiln without introducing additional gases therein.

* * * * *